(12) United States Patent
Kirihara

(10) Patent No.: US 12,256,047 B2
(45) Date of Patent: Mar. 18, 2025

(54) TERMINAL DEVICE AND NON-TRANSITORY COMPUTER READABLE MEDIUM WITH MENU FOR SERVICE SELECTION

(71) Applicant: FUJIFILM BUSINESS INNOVATION CORP., Tokyo (JP)

(72) Inventor: Kazuko Kirihara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 659 days.

(21) Appl. No.: 17/142,906

(22) Filed: Jan. 6, 2021

(65) Prior Publication Data

US 2022/0086292 A1 Mar. 17, 2022

(30) Foreign Application Priority Data

Sep. 17, 2020 (JP) ................................ 2020-156575

(51) Int. Cl.
*H04N 1/00* (2006.01)
(52) U.S. Cl.
CPC ..... *H04N 1/00411* (2013.01); *H04N 1/00427* (2013.01); *H04N 1/0048* (2013.01); *H04N 1/00514* (2013.01); *H04N 1/00517* (2013.01)
(58) Field of Classification Search
None
See application file for complete search history.

(56) References Cited

U.S. PATENT DOCUMENTS

| | | | |
|---|---|---|---|
| 11,489,976 B2 * | 11/2022 | Asai | H04N 1/00411 |
| 2012/0062937 A1 * | 3/2012 | Kirihara | H04N 1/00517 |
| | | | 358/1.15 |
| 2012/0260350 A1 * | 10/2012 | Yamada | H04N 1/00424 |
| | | | 726/28 |
| 2014/0002856 A1 * | 1/2014 | Shimizu | H04N 1/0001 |
| | | | 358/1.15 |
| 2014/0019914 A1 * | 1/2014 | Amano | H04N 1/00474 |
| | | | 715/825 |
| 2014/0215374 A1 * | 7/2014 | Nakao | H04N 1/00517 |
| | | | 715/771 |
| 2016/0248921 A1 * | 8/2016 | Niwa | H04N 1/0035 |
| 2016/0330628 A1 * | 11/2016 | Kakutani | H04W 12/08 |

(Continued)

FOREIGN PATENT DOCUMENTS

| | | |
|---|---|---|
| JP | 2016-130878 A | 7/2016 |
| JP | 2017-151596 A | 8/2017 |
| JP | 2017-194814 A | 10/2017 |

*Primary Examiner* — Neil R McLean
(74) *Attorney, Agent, or Firm* — Oliff PLC

(57) ABSTRACT

A terminal device includes a processor configured to: accept selection of an information processing device as a target to which an instruction to execute a service is to be sent; acquire provision information from the information processing device, the provision information being information on the service provided by the information processing device; and perform a control so as to display a first menu screen on a display, in which display information is information that is set in the terminal device and that indicates whether to display each of plural services, and the first menu screen is a menu screen that is based on (i) the provision information and (ii) the display information and that allows a user to select the service to be executed by the information processing device.

16 Claims, 14 Drawing Sheets

(56) References Cited

U.S. PATENT DOCUMENTS

| | | | | |
|---|---|---|---|---|
| 2016/0373460 | A1* | 12/2016 | Itoh | H04L 67/02 |
| 2017/0070625 | A1* | 3/2017 | Yee | H04N 1/00482 |
| 2017/0310843 | A1* | 10/2017 | Kadoda | H04N 1/00344 |
| 2018/0352098 | A1* | 12/2018 | Kanamaru | H04M 1/72412 |
| 2019/0356797 | A1* | 11/2019 | Nagasawa | H04N 1/00498 |

* cited by examiner

PROVIDED SERVICE DATABASE

| SERVICE | AVAILABILITY |
|---|---|
| IMAGE TRANSMISSION | PROVIDABLE |
| IMAGE READING | PROVIDABLE |
| IMAGE PRINTING | NON-PROVIDABLE |
| ⋮ | ⋮ |

PROVIDED SETTING ITEM DATABASE

| SERVICE | PROVIDED ITEM | PROVIDABLE SETTING | PROVIDED SETTING |
|---|---|---|---|
| IMAGE TRANSMISSION | RESOLUTION | 200/300/400/600dpi | 200dpi |
| | FORMAT | JPEG/PDF | PDF |
| | ⋮ | ⋮ | ⋮ |
| ⋮ | ⋮ | ⋮ | ⋮ |

FIG.5

PROHIBITION SETTING DATABASE

| PROVIDED ITEM | PROVIDED SETTING | PROHIBITION ITEM | PROHIBITION SETTING |
|---|---|---|---|
| RESOLUTION | 400 dpi OR MORE | MAGNIFICATION | 5 OR MORE TIMES |
| | | ⋮ | ⋮ |
| ⋮ | ⋮ | ⋮ | ⋮ |

FIG.6

DISPLAY INFORMATION DATABASE

| ROLE | SERVICE | DISPLAY INFORMATION |
|---|---|---|
| IN-HOUSE WORK | IMAGE TRANSMISSION | DISPLAYED |
| | IMAGE READING | NO INSTRUCTION |
| | ⋮ | ⋮ |
| CUSTOMER A | IMAGE TRANSMISSION | NOT DISPLAYED |
| | IMAGE READING | DISPLAYED |
| | ⋮ | ⋮ |
| ⋮ | ⋮ | ⋮ |

FIG.7

HISTORY INFORMATION DATABASE

| ROLE | SERVICE | SERVICE EXECUTION DATE /TIME |
|---|---|---|
| IN-HOUSE WORK | IMAGE TRANSMISSION | 2020/6/25 13:00 |
| | | 2020/6/25 11:00 |
| | | ⋮ |
| | IMAGE READING | 2020/6/23 18:00 |
| | | ⋮ |
| ⋮ | ⋮ | ⋮ |

FIG.8

SETTING INFORMATION DATABASE

| ROLE | SERVICE | EXECUTION ITEM | EXECUTION SETTING |
|---|---|---|---|
| IN-HOUSE WORK | IMAGE TRANSMISSION | RESOLUTION | 400dpi |
| | | FORMAT | TITF |
| | | ⋮ | ⋮ |
| | ⋮ | ⋮ | ⋮ |
| ⋮ | ⋮ | ⋮ | ⋮ |

FIG.10

ROLE SELECTION SCREEN  25

PLEASE SELECT A ROLE

IN-HOUSE WORK

CUSTOMER A

SETTING INFORMATION REGISTRATION SCREEN 25

WILL YOU REGISTER THE FOLLOWING SETTING ITEMS AS SETTING ITEMS OF AN IMAGE TRANSMISSION SERVICE FOR IN-HOUSE WORK?

RESOLUTION : 400dpi
FORMAT : PDF
MAGNIFICATION : 3 X
⋮

25A YES    25B NO

TERMINAL DEVICE AND NON-TRANSITORY COMPUTER READABLE MEDIUM WITH MENU FOR SERVICE SELECTION

CROSS-REFERENCE TO RELATED APPLICATIONS

This application is based on and claims priority under 35 USC 119 from Japanese Patent Application No. 2020-156575 filed Sep. 17, 2020.

BACKGROUND

(i) Technical Field

The present disclosure relates to a terminal device and a non-transitory computer readable medium.

(ii) Related Art

JP-A-2017-194814 discloses an instruction device that instructs a processing device to perform a process. The instruction device includes an information acquisition unit that acquires information on the processing device, a device information transmission unit that simultaneously transmits the information on the processing device acquired by the information acquisition unit and information on the instruction device to a management device, and a display device. The display device displays an operation screen for the instruction device, which is generated by an operation screen generation unit in the management device based on the information transmitted from the device information transmission unit, and transmitted from an operation screen transmission unit in the management device.

SUMMARY

For example, there is a technique that displays, on an own device that is a mobile terminal, a menu screen that is generated considering (i) services provided by an information processing device that is a connection destination and (ii) a configuration desired by a user. In this technique, a device other than the own device generates the menu screen considering (i) the services provided by the information processing device, which is the connection destination and (ii) the configuration desired by the user. Thus, it is necessary to once send display information on the configuration desired by the user to the device other than the own device.

Aspects of non-limiting embodiments of the present disclosure relate to a terminal device and a non-transitory computer readable medium that are able to display a menu screen that is generated considering a configuration desired by a user, without sending display information related to the configuration desired by the user to a device other than the own device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a terminal device including a processor configured to: accept selection of an information processing device as a target to which an instruction to execute a service is to be sent; acquire provision information from the information processing device, the provision information being information on the service provided by the information processing device; and perform a control so as to display a first menu screen on a display, in which display information is information that is set in the terminal device and that indicates whether to display each of plural services, and the first menu screen is a menu screen that is based on (i) the provision information and (ii) the display information and that allows a user to select the service to be executed by the information processing device.

BRIEF DESCRIPTION OF THE DRAWINGS

Exemplary embodiment(s) of the present disclosure will be described in detail based on the following figures, wherein:

FIG. 5 is a schematic view illustrating an example of a configuration of a prohibition setting database of the exemplary embodiment;

FIG. 6 is a schematic view illustrating an example of a configuration of a display information database of the exemplary embodiment;

FIG. 7 is a schematic view illustrating an example of a configuration of a history information database of the exemplary embodiment;

FIG. 8 is a schematic view illustrating an example of a configuration of a setting information database of the exemplary embodiment;

FIG. 10 is a front view illustrating an example of a role selection screen of the exemplary embodiment;

FIG. 11 is a front view illustrating an example of a setting information registration screen of the exemplary embodiment;

DETAILED DESCRIPTION

Figure 1:
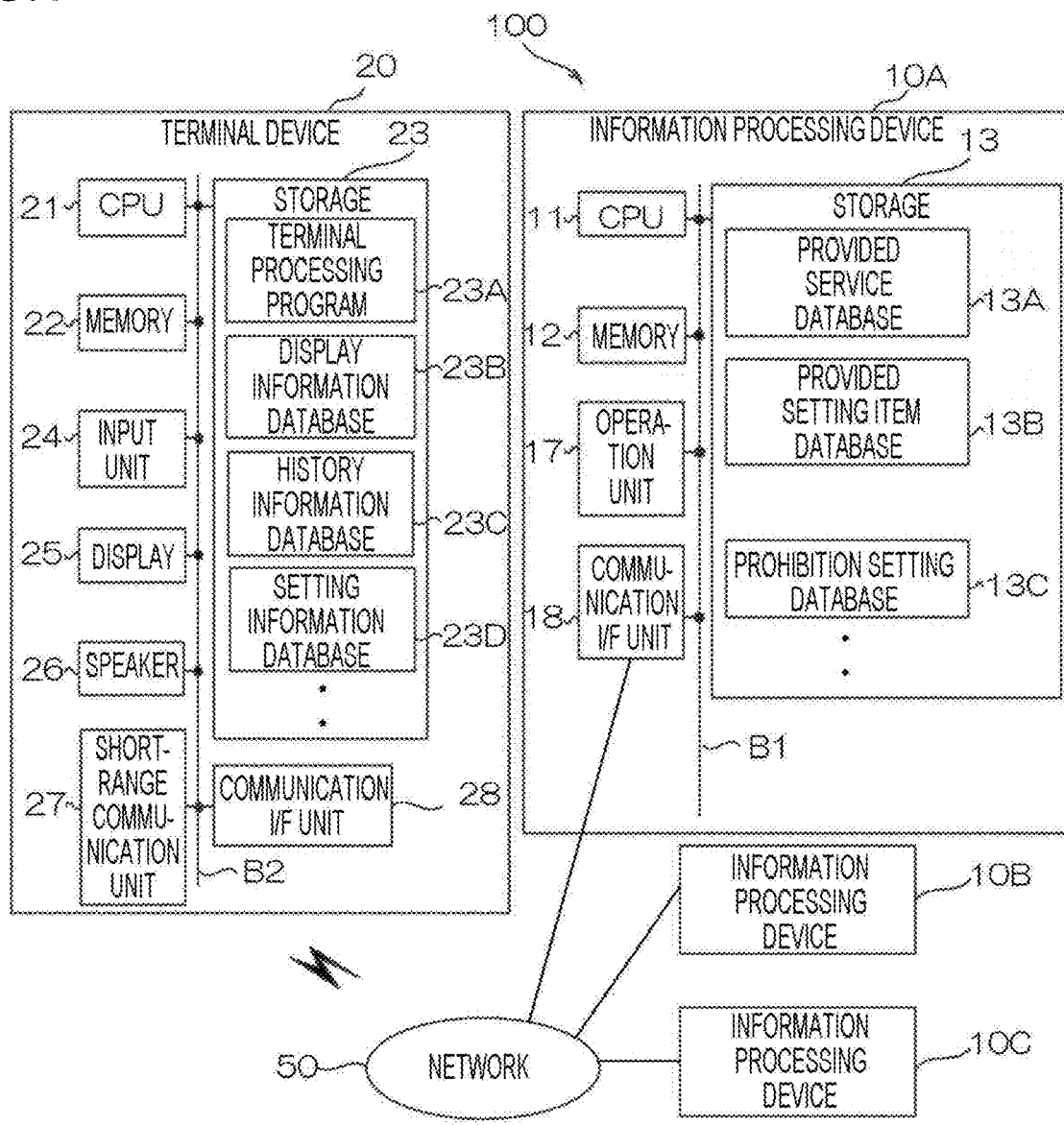
FIG. 1 is a block diagram illustrating an example of a configuration of a terminal processing system of an exemplary embodiment.

Hereinafter, an example of an exemplary embodiment of the present disclosure will be described with reference to the accompanying drawings. Further, the same or similar elements and portions in the drawings will be denoted by the same reference numerals. Dimensional ratios in the drawings may be exaggerated for the convenience of descriptions, and may differ from actual ratios.

FIG. 1 is a block diagram illustrating an example of a hardware configuration of a terminal processing system of the present exemplary embodiment.

As illustrated in FIG. 1, a terminal processing system 100 of the present exemplary embodiment includes plural information processing devices 10A, 10B, . . . , and a terminal device 20, each of which can access a network 50. Hereinafter, when described without distinction, the information processing devices 10A, 10B, . . . will be simply collectively referred to as an "information processing device 10".

In the present exemplary embodiment, an image processing device which is a digital multifunction machine having an image transmission service, an image reading service and an image printing service is used as the information processing device 10. Alternatively, an image processing device, a home appliance, or the like, which has only an image printing function and an image reading function, may be used as the information processing device 10. In the present exemplary embodiment, a smartphone is used as the terminal device 20. Alternatively, other terminal devices such as a tablet terminal and a laptop personal computer may be used as the terminal device 20.

The information processing device 10 of the present exemplary embodiment includes a central processing unit (CPU) 11, a memory 12 as a temporary storage area, a non-volatile storage 13, an operation unit 17, and a communication interface (I/F) unit 18. These configurations are connected to each other via a bus B1.

The storage 13 is implemented by a storage device such as a hard disk drive (HDD), a solid state drive (SSD), or a flash memory. The storage 13 stores various databases such as a provided service database 13A, a provided setting item database 13B, and a prohibition setting database 13C. Details of the databases will be described later.

The operation unit 17 communicates with a short-range communication unit 27 (to be described later) provided in the terminal device 20 within a range of a predetermined distance (10 cm in the present exemplary embodiment).

The communication I/F unit 18 is an interface by which the information processing device 10 communicates with the terminal device 20 and other devices. For the communication, for example, wired communication standards such as Ethernet (registered trademark) or FDDI are used.

Meanwhile, the terminal device 20 of the present exemplary embodiment is a device possessed by a user who causes the information processing device 10 to execute services by using the terminal processing system 100 (hereinafter, simply referred to as a "user"). The terminal device 20 includes a CPU 21, a memory 22 as a temporary storage area, a non-volatile storage 23, an input unit 24, a display 25, a speaker 26, the short-range communication unit 27, and a communication I/F unit 28. These components are connected to each other via a bus B2.

The storage 23 is implemented by a storage device such as an HDD, an SSD, or a flash memory. The storage 23 as a storage medium stores a terminal processing program 23A. The CPU 21 reads the terminal processing program 23A from the storage 23, develops the terminal processing program 23A in the memory 22, and sequentially executes processes included in the terminal processing program 23A. Further, the storage 23 stores various databases such as a display information database 23B, a history information database 23C, and a setting information database 23D. With these databases, it is possible to display a menu screen based on the same information, for plural information processing devices 10 having different services or setting items. Details of the databases will be described later.

The input unit 24 includes a pointing device such as a mouse, and a keyboard, and is used for performing various inputs.

The display 25 is, for example, a liquid crystal display, and displays various information pieces. The display 25 may be of a touch panel type to serve as the input unit 24.

The short-range communication unit 27 communicates with the operation unit 17 provided in the information processing device 10 within a range of the predetermined distance. In the present exemplary embodiment, a communication method using Bluetooth (registered trademark) is used as a communication method performed between the short-range communication unit 27 and the operation unit 17. It is noted that the present disclosure is not limited thereto. For example, other methods such as a method using near field communication (NFC), and a method using Wi-Fi (registered trademark) may be used.

The communication I/F unit 28 is an interface by which the terminal device 20 communicates with the information processing device 10 and other devices. For the communication, for example, wireless communication standards such as 4G, 5G, or Wi-Fi (registered trademark) are used.

When the terminal processing program 23A is executed, the terminal device 20 implements various functions by using the above-described hardware resources. The functional configurations implemented by the terminal device 20 will be described.

Figures 2, 3, 4:
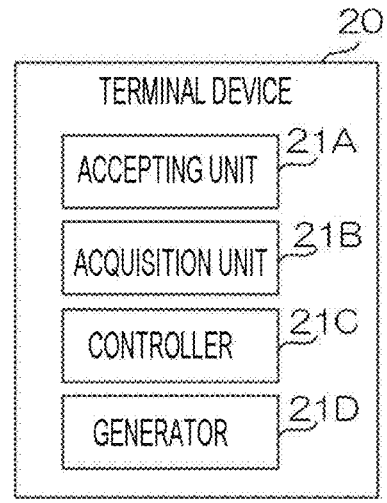
FIG. 2 is a block diagram illustrating an example of functional configurations of a terminal device of the exemplary embodiment.
FIG. 3 is a schematic view illustrating an example of a configuration of a provided service database of the exemplary embodiment.
FIG. 4 is a schematic view illustrating an example of a configuration of a provided setting item database of the exemplary embodiment.

FIG. 2 is a block diagram illustrating an example of the functional configurations of the terminal device 20.

As illustrated in FIG. 2, the terminal device 20 includes an accepting unit 21A, an acquisition unit 21B, a controller 21C, and a generator 21D as functional configurations. Each functional configuration is implemented when the CPU 21 reads and executes the terminal processing program 23A.

The accepting unit 21A of the present exemplary embodiment accepts a selection of the information processing device 10 as a target to which an instruction to execute a service is to be sent.

The acquisition unit 21B of the present exemplary embodiment acquires provision information from the information processing device 10. The provision information is information on a service provided by the information processing device 10.

The controller 21C of the present exemplary embodiment performs a control so as to display a first menu screen on the display 25. Display information is information that is set in the own device and that indicates whether to display each of plural services. The first menu screen is a menu screen that is based on (i) the provision information and (ii) the display information and that allows the user to select a service to be executed by the information processing device 10.

When display information corresponding to a service that the information processing device 10 cannot provide is information indicating that the service is to be displayed on the first menu screen, the controller 21C of the present exemplary embodiment performs a control so as to display the service on the first menu screen in a grayed-out state.

When a service that the information processing device 10 can provide and for which display information is not set is displayed on the first menu screen, the controller 21C of the present exemplary embodiment performs a control so as to set the display information to information indicating that the service is not to be displayed.

When the number of times a service has been executed by the information processing device 10 is equal to or greater than a first threshold number of times, the controller 21C of the present exemplary embodiment performs a control to change display information corresponding to the service.

When the number of times a service has been executed by the information processing device 10 is less than a second threshold number of times, the controller 21C of the present exemplary embodiment performs a control to change display information corresponding to the service.

When performing (i) a control so as not to display a service on the first menu screen or (ii) a control so as to display a service in a grayed-out state on the first menu screen, the controller 21C of the present exemplary embodiment performs a control so as to further present a reason why the control is performed.

More specifically, display information may be information preset for each of plural roles.

The generator 21D of the present exemplary embodiment generates the first menu screen based on the provision information and the display information.

The controller 21C of the present exemplary embodiment displays a second menu screen on the display 25. The second menu screen is a menu screen that is based on (i) the provision information and (ii) setting information that indicates a setting item to be applied when a service is executed by the information processing device 10.

When the setting information is included in the provision information, the controller 21C of the present exemplary embodiment performs a control to display the setting information on the second menu screen.

When (i) the setting information is not included in the provision information or (ii) the setting information is not set, the controller 21C of the present exemplary embodiment performs a control to display provided setting information on the second menu screen. The provided setting information is information that indicates a predetermined setting item to be applied when a service is provided by the information processing device 10.

The accepting unit 21A of the present exemplary embodiment further accepts an instruction indicating whether to apply a setting item corresponding to (i) the setting information or (ii) the provided setting information displayed on the second menu screen, to cause the information processing device 10 to execute a service.

When the instruction accepted by the accepting unit 21A is an instruction indicating that the setting item is applied to provide the service, the controller 21C of the present exemplary embodiment further performs a control such that the setting item is applied and the service is executed by the information processing device 10.

The accepting unit 21A of the present exemplary embodiment further accepts a change of the setting information.

When the setting information accepted by the accepting unit 21A is not included in the provision information, the controller 21C of the present exemplary embodiment performs a control so as to change the setting information to the provided setting information.

Next, the provided service database 13A of the present exemplary embodiment will be described with reference to FIG. 3. As illustrated in FIG. 3, the provided service database 13A of the present exemplary embodiment stores information pieces such as a service and availability in association with each other.

The service is information indicating a service that the information processing device 10 has. The availability is information indicating whether the corresponding service can be provided by the information processing device 10.

In the present exemplary embodiment, an image transmission service, an image reading service, an image printing service and an Internet fax service are employed as the service. Alternatively, the service may include other services such as a service for transmitting images read by an image reading service to a server. Further alternatively, a single service, or a combination of plural services may be applied.

Next, the provided setting item database 13B of the present exemplary embodiment will be described with reference to FIG. 4. As illustrated in FIG. 4, the provided setting item database 13B of the present exemplary embodiment stores information pieces such as a service, a provided item, a providable setting, and a provided setting in association with each other.

The service is the same information as the service in the provided service database 13A. The provided item is information indicating an item that is applicable when the corresponding service is provided by the information processing device 10. The providable setting is information indicating a setting that is applicable when the corresponding service is provided by the information processing device 10. The provided setting is the same information as the above-described provided setting information.

In the present exemplary embodiment, resolution, format, magnification, and color printing are employed as the provided item. Alternatively, the provided item may include other items such as destination and double-side reading, and a single item, or a combination of plural items may be applied.

Next, the prohibition setting database 13C of the present exemplary embodiment will be described with reference to FIG. 5. As illustrated in FIG. 5, the prohibition setting database 13C of the present exemplary embodiment stores information pieces such as a provided item, a provided setting, a prohibition item, and a prohibition setting in association with each other.

The provided item is the same information as the provided item in the provided setting item database 13B. The provided setting is the same information as the above-described provided setting information. The prohibition item is information indicating an item that is unapplicable when the provided setting corresponding to the corresponding provided item is applied by the information processing device 10. The prohibition setting is information indicating a setting that is unapplicable when the provided setting corresponding to the corresponding provided item is provided by the information processing device 10. The example illustrated in FIG. 5 indicates that magnification of 5 or more times is unapplicable when the information processing device 10 applies 400 dpi or more as the resolution.

Next, the display information database 23B of the present exemplary embodiment will be described with reference to FIG. 6. As illustrated in FIG. 6, the display information database 23B of the present exemplary embodiment stores information pieces such as a role, a service, and display information in association with each other.

The role is information indicating a role when the user causes the information processing device 10 to execute a service. The service is the same information as the service in the provided service database 13A. The display information is the same information as the above described display information.

In the present exemplary embodiment, any of information pieces including information indicating that the corresponding service is displayed, information indicating that the corresponding service is not displayed, and information indicating that whether to display the corresponding service is not specified is employed as the display information. Alternatively, the information indicating whether to display the corresponding service is not specified may not be employed as the display information. Hereinafter, the information indicating whether to display the corresponding service is not specified will b e referred to as unspecified information.

Next, the history information database 23C of the present exemplary embodiment will be described with reference to FIG. 7. As illustrated in FIG. 7, the history information database 23C of the present exemplary embodiment stores information pieces such as a role, a service, and a service execution date and time in association with each other.

The role is the same information as the role in the display information database 23B. The service is the same information as the service in the provided service database 13A. The service execution date and time is information indicating the date and time when the corresponding service is executed by any of the information processing devices 10.

Next, the setting information database 23D of the present exemplary embodiment will be described with reference to FIG. 8. As illustrated in FIG. 8, the setting information database 23D of the present exemplary embodiment stores information pieces such as a role, a service, an execution item, and an execution setting in association with each other.

The role is the same information as the role in the display information database 23B. The service is the same information as the service in the provided service database 13A. The execution item is information indicating an item that is applied when the corresponding service is executed by the information processing device 10. The execution setting is information indicating a setting that is applied when the corresponding service is executed by the information processing device 10. The execution setting may not be specified.

Next, an operation of the terminal device 20 of the present exemplary embodiment will be described with reference to FIG. 9 to FIG. 20. When the user activates the terminal device 20, the CPU 21 of the terminal device 20 executes the terminal processing program 23A, thereby executing terminal processing illustrated in FIG. 9. Here, descriptions will be made on a case where databases have already been constructed. Here, descriptions will be made on a case where the terminal device 20 has plural roles.

Figure 9:
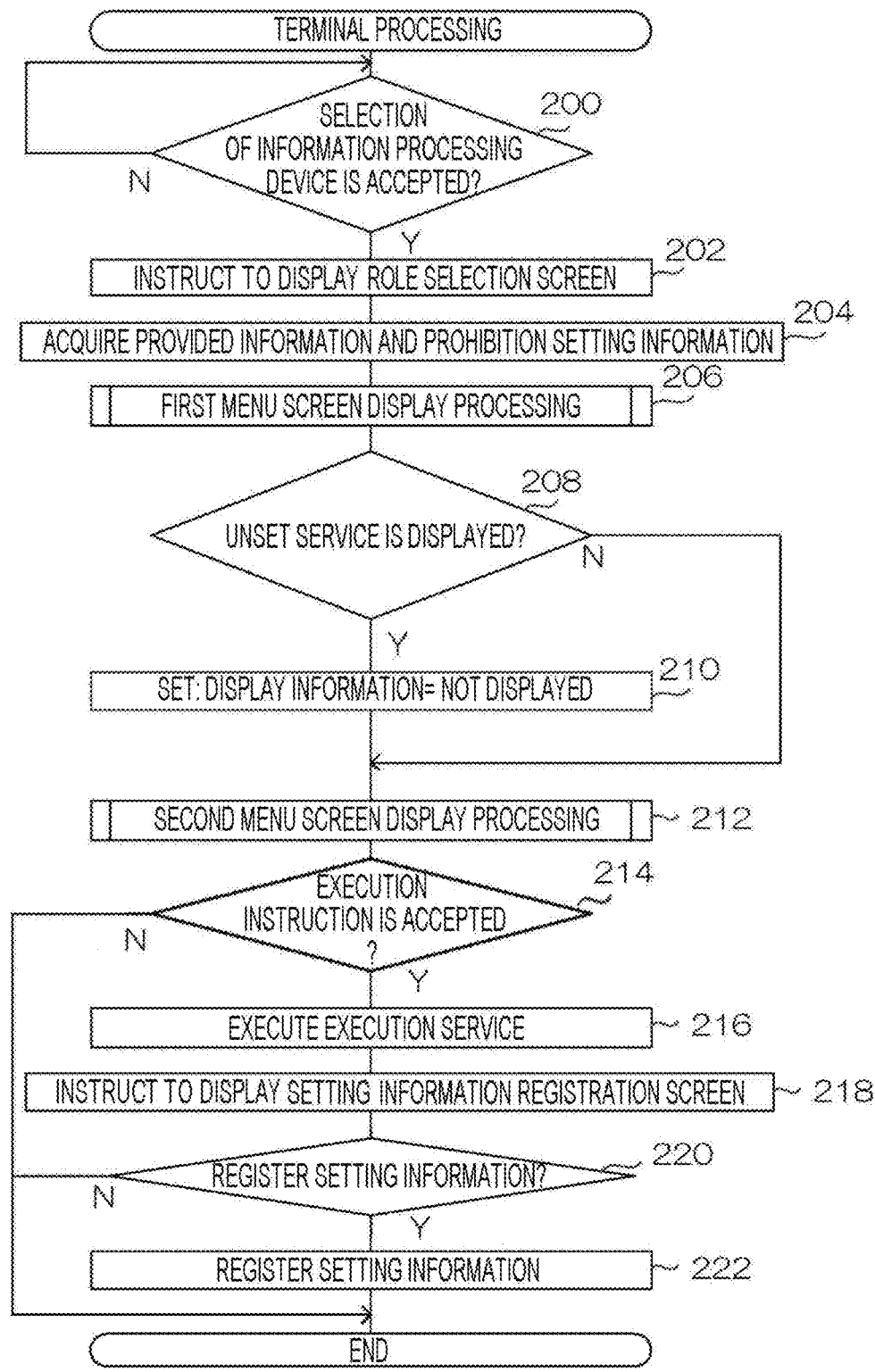
FIG. 9 is a flowchart illustrating an example of terminal processing of the exemplary embodiment.

In step 200 in FIG. 9, the CPU 21 waits until accepting a selection of the information processing device 10. Specifically, the CPU 21 waits until accepting information indicating that a communication between the operation unit 17 and the short-range communication unit 27 has been successful, via the communication I/F unit 28, from the information processing device 10 selected by the user (hereinafter, referred to as a target information processing device). When the terminal device 20 has plural roles, the CPU 21 also accepts an instruction indicating that a role is selected, from the target information processing device.

In step 202, the CPU 21 performs a control so as to display a role selection screen on the display 25 in a predetermined format.

As illustrated in FIG. 10, on the role selection screen of the present exemplary embodiment, an urging message for input of a role, and roles stored in the display information database 23B are displayed. As an example, when the role selection screen illustrated in FIG. 10 is displayed on the display 25, the user selects any of the roles through the input unit 24.

In step 204, the CPU 21 acquires provision information and prohibition setting information. Specifically, the CPU 21 acquires the provided service database 13A, the provided setting item database 13B, and the prohibition setting database 13C from the target information processing device via the communication I/F unit 28.

In step 206, the CPU 21 executes first menu screen display processing which is a process of displaying a first menu screen on the display 25. Details of the first menu screen display processing of the present exemplary embodiment will be described later with reference to FIGS. 12A and 12B.

In step 208, the CPU 21 determines whether an unset service is displayed on the first menu screen. Specifically, the CPU 21 determines whether an unset service that is providable by the target information processing device but has no setting of display information, is displayed on the first menu screen. The CPU 21 proceeds to step 210 when an affirmative determination is made in the process in step 208, and proceeds to step 212 when a negative determination is made.

In step 210, the CPU 21 registers display information corresponding to the unset service, as information indicating that the service is not displayed, in the display information database 23B.

In step 212, the CPU 21 executes second menu screen display processing which is a process of displaying a second menu screen on the display 25. Details of the second menu screen display processing of the present exemplary embodiment will be described later with reference to FIGS. 16A and 16B.

In step 214, the CPU 21 determines whether an execution instruction has been accepted. Specifically, the CPU 21 determines whether an instruction indicating that execution items displayed on the second menu screen, and display settings determined through the second menu screen display processing are applied to execute an execution service has been accepted. That is, the CPU 21 determines whether a YES button 25G has been selected on the second menu screen to be described later, via the input unit 24. The CPU 21 proceeds to step 216 when an affirmative determination is made in the process in step 214, and ends the terminal processing when a negative determination is made.

In step 216, the CPU 21 executes the execution service. Specifically, the CPU 21 applies the execution items and the display settings displayed on the second menu screen, and causes the target information processing device to execute the execution service which is a service selected by the process in step 428 to be described later.

In step 218, the CPU 21 performs a control so as to display a setting information registration screen on the display 25 in a predetermined format.

As illustrated in FIG. 11, on the setting information registration screen of the present exemplary embodiment, the same information as execution items and display settings displayed on the second menu screen to be described later is displayed. As an example, when the setting information registration screen illustrated in FIG. 11 is displayed on the display 25, the user selects a YES button 25A via the input unit 24 if the displayed execution items and the display settings are to be registered as setting information corresponding to the execution service. Meanwhile, the user selects a NO button 25B via the input unit 24 if the displayed execution items and the display settings are not to be registered as setting information corresponding to the execution service.

In step 220, the CPU 21 determines whether to register the execution items and the display settings as the setting information. That is, the CPU 21 determines whether the YES button 25A has been selected on the setting information registration screen. The CPU 21 proceeds to step 222 when an affirmative determination is made in the process in step 220, and ends the terminal processing when a negative determination is made.

In step 222, the CPU 21 registers the setting information, and ends the terminal processing. Specifically, the CPU 21 registers the execution items and the display settings as the setting information corresponding to the execution service, in the setting information database 23D, and ends the terminal processing. Through this process, the setting information stored in the terminal device 20 may be optimized.

Next, details of the first menu screen display processing of the present exemplary embodiment will be described with reference to FIGS. 12A and 12B.

Figure 12A:
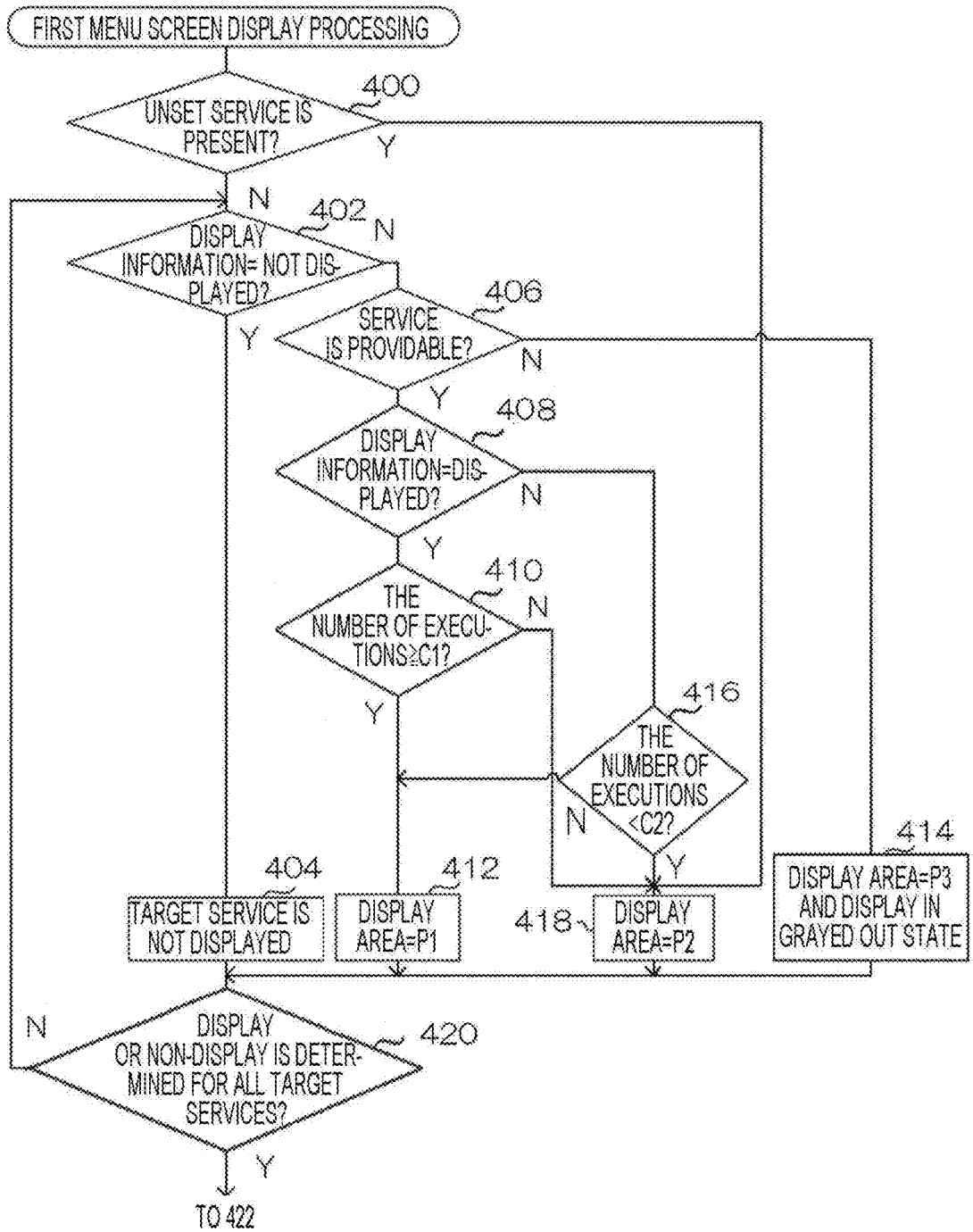
FIGS. 12A and 12B are a flowchart illustrating an example of first menu screen display processing of the exemplary embodiment.
Figure 12B:
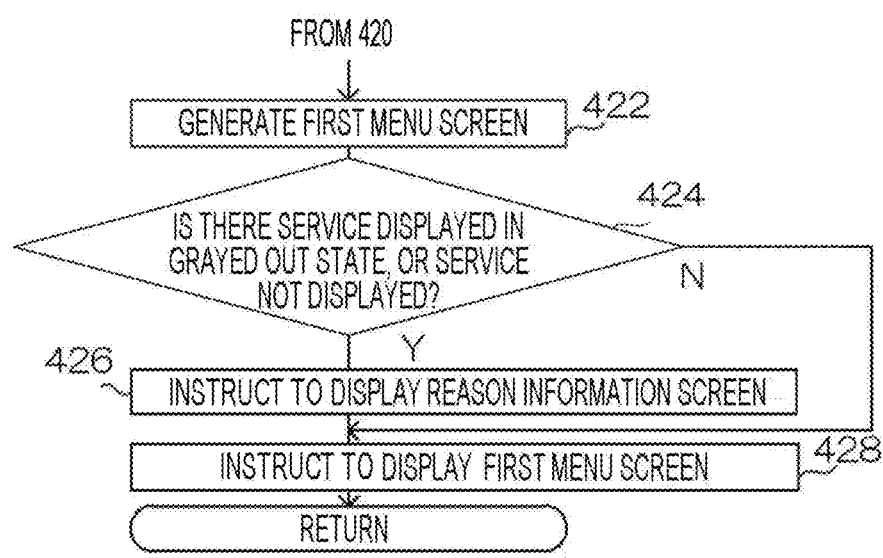

In step 400 in FIG. 12A, the CPU 21 determines whether an unset service is present. Specifically, the CPU 21 reads the provided service database 13A and the display information database 23B, and determines whether an unset service is present. The CPU 21 proceeds to step 418 when an affirmative determination is made in the process in step 400, and proceeds to step 402 when a negative determination is made.

In step 402, the CPU 21 determines whether the display information is information indicating that the corresponding service is not displayed. Specifically, the CPU 21 determines whether the display information corresponding to a service corresponding to the role selected by the process in step 202 (hereinafter, referred to as a "target service") is information indicating that the corresponding target service is not displayed, from the display information database 23B. The CPU 21 proceeds to step 404 when an affirmative determination is made in the process in step 402, and proceeds to step 406 when a negative determination is made.

In step 404, the CPU 21 registers the effect that the target service is not displayed on the first menu screen, in the storage 23, and proceeds to step 420 to be described later.

In step 406, the CPU 21 determines whether the target service is providable. Specifically, the CPU 21 reads availability corresponding to the target service, from the provided service database 13A, and determines whether the target service is providable by the target information processing device. The CPU 21 proceeds to step 408 when an affirmative determination is made in the process in step 406.

In step 408, the CPU 21 determines whether the display information is information indicating that the corresponding service is displayed. Specifically, the CPU 21 determines whether the display information corresponding to the target service is information indicating that the target service is displayed, from the display information database 23B. The CPU 21 proceeds to step 410 when an affirmative determination is made in the process in step 408. The CPU 21 proceeds to step 416 when a negative determination is made in the process in step 408, that is, when the display information is unspecified information.

In step 410, the CPU 21 determines whether the number of executions is equal to or greater than a first threshold number of times. Specifically, the CPU 21 reads the history information database 23C and determines whether the number of executions, that is, the number of times the target service is executed by any of the information processing devices 10 for a predetermined period (for example, for one month), is equal to or greater than the first threshold number of times (for example, 5 times). The CPU 21 proceeds to step 412 when an affirmative determination is made in the process in step 410. When a negative determination is made in the process in step 410, the CPU 21 changes the display information corresponding to the target service to unspecified information, and proceeds to step 418.

In step 412, the CPU 21 registers the effect that the target service is displayed on the first menu screen, and a display area of the target service on the first menu screen (hereinafter, simply referred to as "display area") is P1, in the storage 23.

Figure 13:
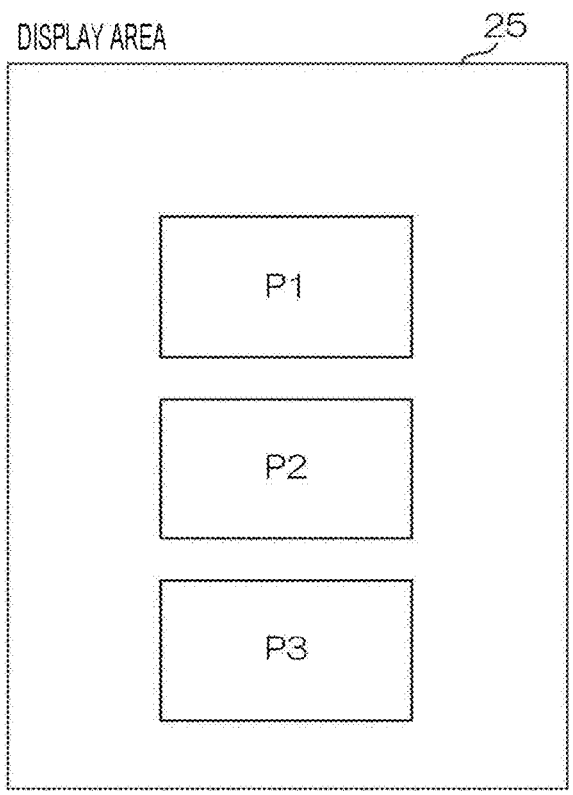
FIG. 13 is a front view illustrating an example of a display area of the exemplary embodiment.

As illustrated in FIG. 13, in the present exemplary embodiment, for display areas, the display 25 is divided into three portions in the up-down direction and an upper area, a middle area, and a lower area are set as areas P1, P2, and P3, respectively. Alternatively, for display areas, the display 25 may be divided into more than three portions or two portions in the up-down direction. Further alternatively, the display 25 may be divided in the left-right direction.

In the present exemplary embodiment, the CPU 21 does not accept a scroll operation by the user on the first menu screen displayed on the display 25. Alternatively, the CPU 21 may accept the scroll operation. In this case, even when the scroll operation is performed by the user, the display areas illustrated in FIG. 13, as an example, are not moved.

Referring back to step 406, when a negative determination is made, the process proceeds to step 414. In step 414, the CPU 21 registers the effect that the display area is P3, and the target service is displayed in a grayed-out state on the first menu screen, in the storage 23.

In step 416, the CPU 21 determines whether the number of executions is less than a second threshold number of times. Specifically, the CPU 21 determines whether the number of executions is less than the second threshold number of times (for example, 10 times), from the history information database 23C. When an affirmative determination is made in the process in step 416, the CPU 21 proceeds to step 418. When a negative determination is made in the process in step 416, the CPU 21 changes the display information corresponding to the target service from the unspecified information to information indicating that the service is displayed, and proceeds to step 412.

In the present exemplary embodiment, a period determined in advance by an administrator of the target information processing device is employed as the predetermined period. Alternatively, a period determined by the user in advance may be applied. Further alternatively, a period automatically determined for each terminal device 20 according to the frequency or the like at which a service is executed by the target information processing device may be employed as the predetermined period.

In the present exemplary embodiment, the numbers of times determined in advance by the administrator of the target information processing device are employed as the first threshold number of times and the second threshold number of times. Alternatively, the numbers of times determined by the user in advance may be applied. Further alternatively, the numbers of times automatically determined for each terminal device 20 according to the frequency or the like at which a service is executed by the target information processing device may be employed as these threshold numbers of times. In the present exemplary embodiment, the number of times larger than the first threshold number of times is applied as the second threshold number of times. Alternatively, the same number of times as the first threshold number of times may be employed as the second threshold number of times.

In step 418, the CPU 21 registers the effect that the target service or the unset service is displayed on the first menu screen, and the display area is P2, in the storage 23.

In step 420, the CPU 21 determines whether display or non-display has been determined for all target services. Specifically, the CPU 21 reads the storage 23, and determines whether display or non-display on the first menu screen has been determined for all target services registered in the display information database 23B. The CPU 21 proceeds to step 422 when an affirmative determination is made in the process in step 420, and returns to step 402 when a negative determination is made.

In step 422, the CPU 21 reads the storage 23, and generates the first menu screen from the information registered through the above-described processing.

In step 424, the CPU 21 determines whether there is a service that is displayed in a grayed-out state on the first menu screen, or there is a service that is not displayed on the first menu screen. That is, the CPU 21 determines whether at least one of the process in step 404 or the process in step 414 has been executed. The CPU 21 proceeds to step 426 when an affirmative determination is made in the process in step 424, and proceeds to step 428 when a negative determination is made.

In step 426, the CPU 21 performs a control so as to display a reason information screen on the display 25 in a predetermined format.

Figure 14:
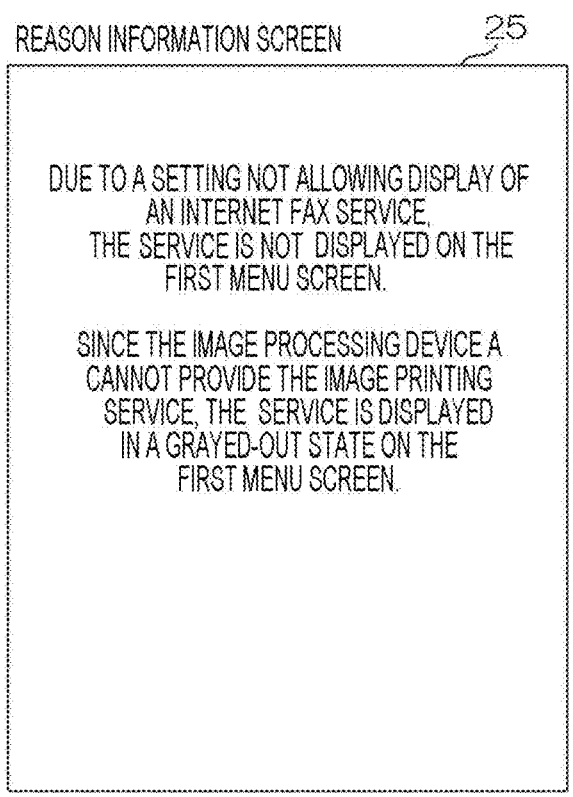
FIG. 14 is a front view illustrating an example of a reason information screen of the exemplary embodiment.

As illustrated in FIG. 14, on the reason information screen of the present exemplary embodiment, reason information indicating at least one of reasons including the reason why the service is not displayed on the first menu screen, and the reason why the service is displayed in a grayed-out state on the first menu screen is displayed. As an example, when the reason information screen illustrated in FIG. 14 is displayed on the display 25, the user may grasp the reason information.

In the present exemplary embodiment, the CPU 21 performs a control so as to display the reason information on the display 25. Alternatively, the CPU 21 may present the reason information by voice via the speaker 26.

In step 428, the CPU 21 performs a control so as to display the first menu screen generated through the process in step 422 on the display 25, and ends the first menu screen display processing. When the first menu screen display processing is ended, the CPU 21 proceeds to step 208 in the terminal processing (see FIG. 9).

Figure 15:
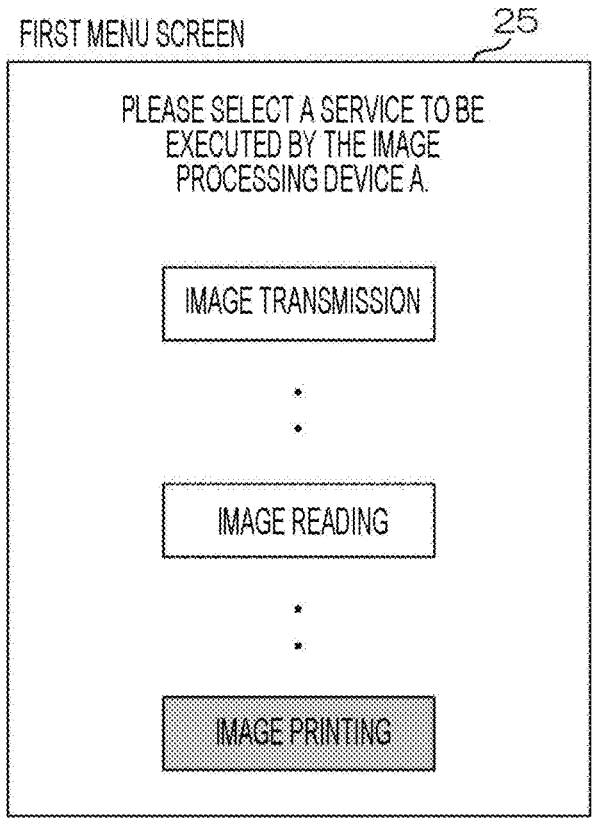
FIG. 15 is a front view illustrating an example of a first menu screen of the exemplary embodiment.

As illustrated in FIG. 15, on the first menu screen of the present exemplary embodiment, an urging message for selection of a service to be executed by the target information processing device (an image processing device A in the example illustrated in FIG. 15) and services are displayed. In the example illustrated in FIG. 15, an image transmission service is displayed in the area P1, an image reading service is displayed in the area P2, and an image printing service is displayed in a grayed-out state in the area P3. As an example, when the first menu screen illustrated in FIG. 15 is displayed on the display 25, the user selects any of services displayed in a state other than the grayed-out state (the image transmission service or the image reading service in the example illustrated in FIG. 15), via the input unit 24.

Next, details of the second menu screen display processing of the present exemplary embodiment will be described with reference to FIGS. 16A and 16B.

Figure 16A:
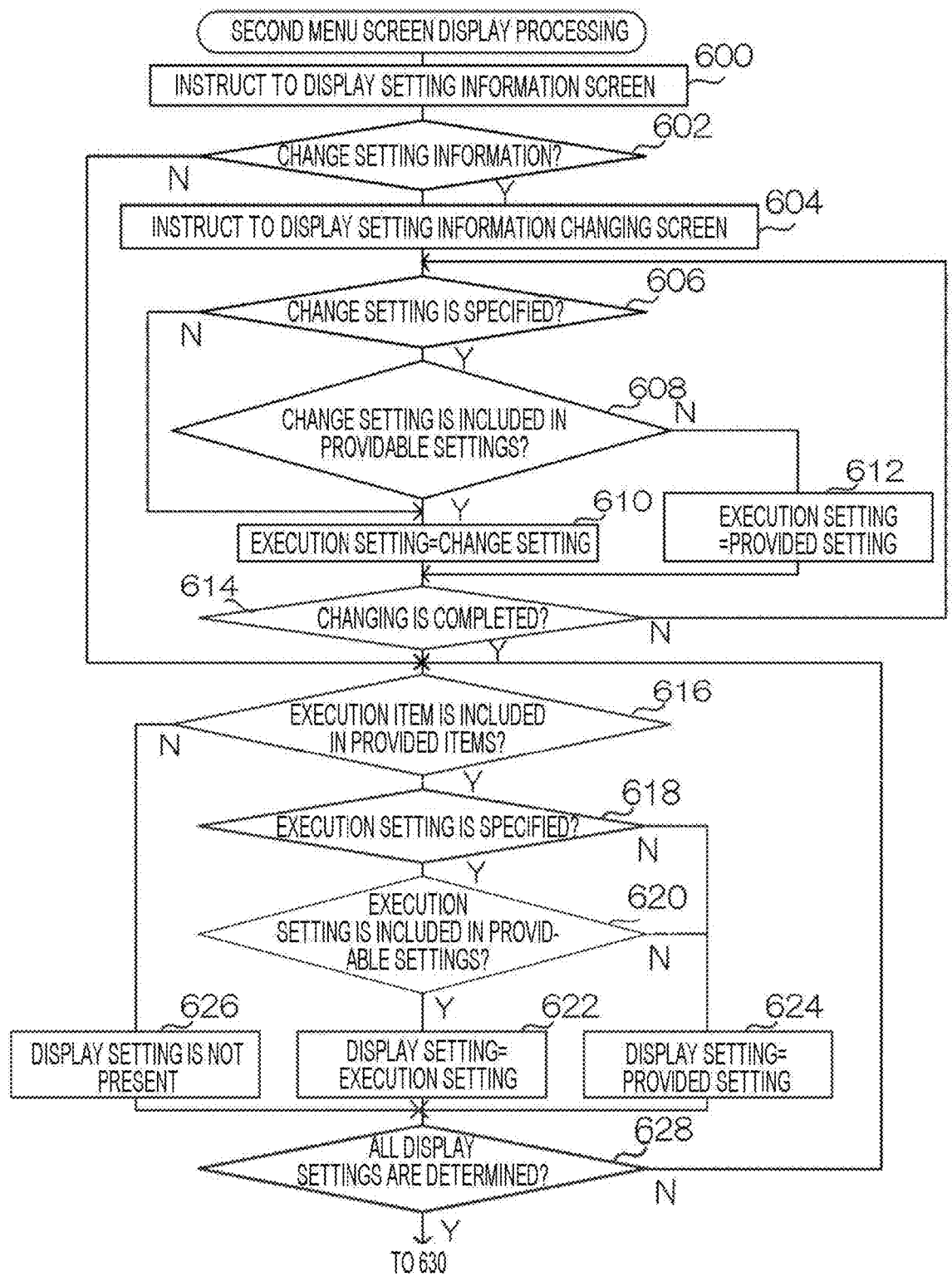
FIGS. 16A and 16B are a flowchart illustrating an example of second menu screen display processing of the exemplary embodiment.
Figure 16B:
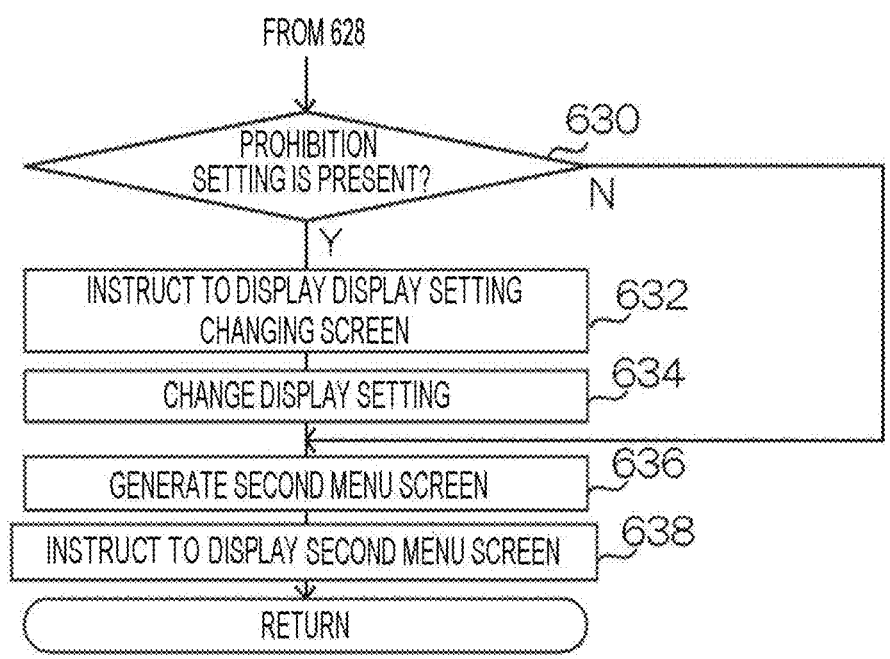

In step 600 in FIG. 16A, the CPU 21 performs a control so as to display a setting information screen on the display 25 in a predetermined format. Specifically, first, the CPU 21 reads execution items and execution settings (hereinafter, referred to as setting information) corresponding to the execution service, from the setting information database 23D. Next, the CPU 21 performs a control so as to display, on the display 25, the setting information screen on which the setting information is displayed.

Figure 17:
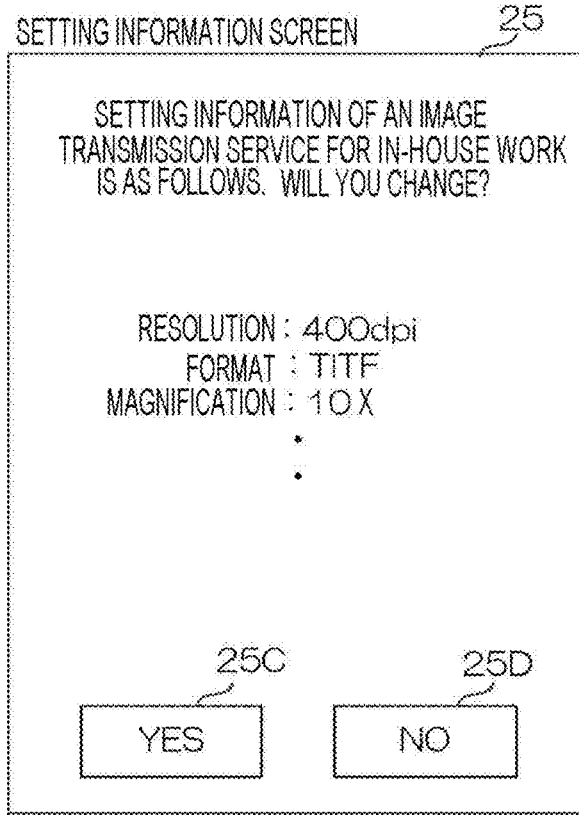
FIG. 17 is a front view illustrating an example of a setting information screen of the exemplary embodiment.

As illustrated in FIG. 17, on the setting information screen of the present exemplary embodiment, the setting information corresponding to the execution service (the image transmission service in the example illustrated in FIG. 17) is displayed. As an example, when the setting information screen illustrated in FIG. 17 is displayed on the display 25, the user selects a YES button 25C via the input unit 24 if changing the displayed setting information. Meanwhile, the user selects a NO button 25D via the input unit 24 when not changing the displayed setting information.

In step 602, the CPU 21 determines whether to change the setting information. That is, the CPU 21 determines whether the YES button 25C has been selected via the input unit 24, on the setting information screen. The CPU 21 proceeds to step 604 when an affirmative determination is made in the process in step 602, and proceeds to step 616 when a negative determination is made.

In step 604, the CPU 21 performs a control so as to display a setting information changing screen on the display 25 in a predetermined format.

Figure 18:
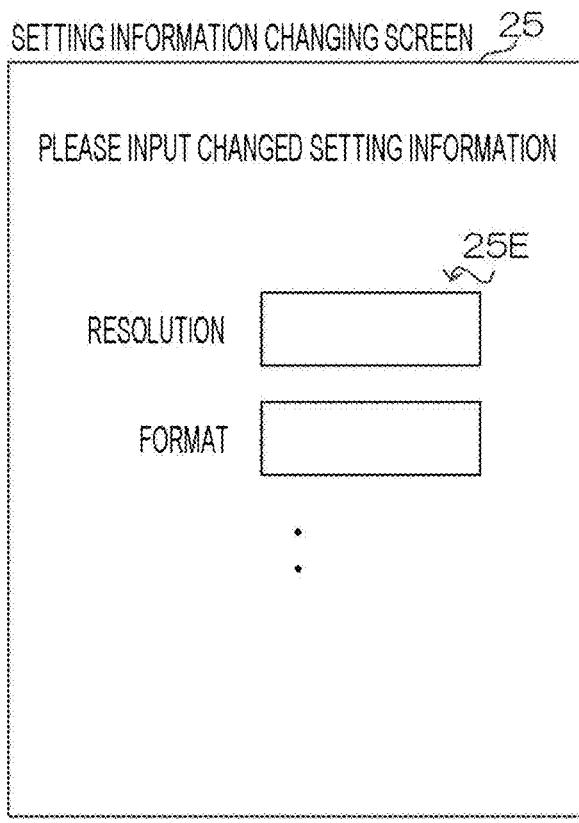
FIG. 18 is a front view illustrating an example of a setting information changing screen of the exemplary embodiment.

As illustrated in FIG. 18, on the setting information changing screen of the present exemplary embodiment, an urging message for input of changed setting information, and an input area 25E for input of changed setting information are displayed. As an example, when the setting information changing screen illustrated in FIG. 18 is displayed on the display 25, the user inputs desired settings (hereinafter, referred to as "change settings"), in the input area 25E corresponding to items whose change is desired (hereinafter, referred to as "change items"), via the input unit 24.

In step 606, the CPU 21 determines whether change settings have been specified. The CPU 21 proceeds to step 608 when an affirmative determination is made in the process in step 606, and proceeds to step 610 when a negative determination is made.

In step 608, the CPU 21 determines whether the change setting is included in providable settings. Specifically, the CPU 21 reads the provided setting item database 13B, and determines whether the change setting is included in the providable settings corresponding to the change item. The CPU 21 proceeds to step 610 when an affirmative determination is made in the process in step 608, and proceeds to step 612 when a negative determination is made.

In step 610, the CPU 21 sets the change setting as the execution setting. Specifically, the CPU 21 registers the change setting, as the execution setting corresponding to the change item, in the setting information database 23D.

In step 612, the CPU 21 sets a provided setting as the execution setting. Specifically, the CPU 21 reads a provided setting corresponding to the change item from the provided setting item database 13B, and registers the corresponding provided setting as the execution setting, in the setting information database 23D.

In step 614, the CPU 21 determines whether changing has been completed. Specifically, the CPU 21 determines whether execution settings corresponding to all change items have been registered in the setting information database 23D. The CPU 21 proceeds to step 616 when an affirmative determination is made in the process in step 614, and returns to step 606 when a negative determination is made.

In step 616, the CPU 21 determines whether the execution item is included in provided items. Specifically, first, the CPU 21 reads the execution item corresponding to the execution service, from the setting information database 23D. Next, the CPU 21 determines whether the execution item is included in the provided items, from the provided setting item database 13B. The CPU 21 proceeds to step 618 when an affirmative determination is made in the process in step 616, and proceeds to step 626 when a negative determination is made.

In step 618, the CPU 21 determines whether the execution setting is specified. Specifically, the CPU 21 determines whether the execution setting corresponding to the execution service is specified, from the setting information database 23D. The CPU 21 proceeds to step 620 when an affirmative determination is made in the process in step 618, and proceeds to step 624 when a negative determination is made.

In step 620, the CPU 21 determines whether the execution setting is included in the providable settings. Specifically, the CPU 21 determines whether the execution setting is included in the providable settings, from the provided setting item database 13B. The CPU 21 proceeds to step 622 when an affirmative determination is made in the process in step 620, and proceeds to step 624 when a negative determination is made.

In step 622, the CPU 21 sets the execution setting as the display setting. Specifically, the CPU 21 registers the effect that the execution setting is set as the display setting which is a setting corresponding to the execution item, and is a setting to be displayed on the second menu screen, in the storage 23.

In step 624, the CPU 21 sets the provided setting as the display setting. Specifically, the CPU 21 reads the provided setting corresponding to the execution item from the provided setting item database 13B, and registers the purport that the corresponding provided setting is set as the display setting, in the storage 23.

In step 626, the CPU 21 registers the effect that no display setting corresponding to the execution item is set, in the storage 23.

In step 628, the CPU 21 determines whether display settings corresponding to all execution items have been determined. The CPU 21 proceeds to step 630 when an affirmative determination is made in the process in step 628, and returns to step 616 when a negative determination is made.

In step 630, the CPU 21 determines whether a prohibition setting is present. Specifically, the CPU 21 reads the prohibition setting database 13C, and determines whether a prohibition item and a prohibition setting that correspond to the execution item and the display setting are included in any execution item and any display setting that are other than the execution item and the display setting. The CPU 21 proceeds to step 632 when an affirmative determination is made in the process in step 630, and proceeds to step 636 when a negative determination is made.

In step 632, the CPU 21 performs a control so as to display a display setting screen on the display 25 in a predetermined format.

Figure 19:
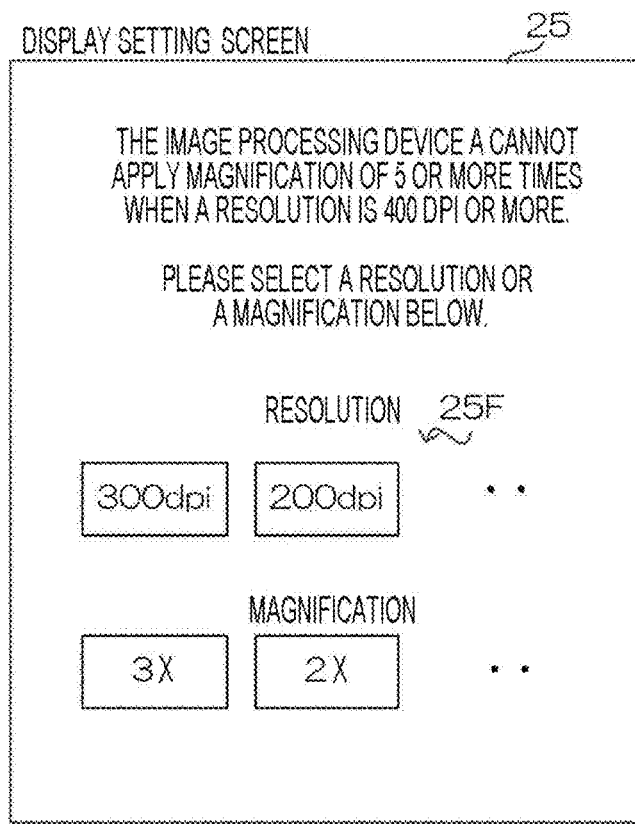
FIG. 19 is a front view illustrating an example of a display setting screen of the exemplary embodiment.

As illustrated in FIG. 19, on the display setting screen of the present exemplary embodiment, (i) the execution item and the display setting and (ii) the prohibition item and the prohibition setting which correspond to the execution item and the display setting are displayed. On the display setting screen of the present exemplary embodiment, an urging message for change of the execution item and the display setting, or the prohibition item and the prohibition setting, and a selection designation area 25F for selecting the execution item and the display setting, or the prohibition item and the prohibition setting are displayed.

In step 634, the CPU 21 changes the display setting. Specifically, the CPU 21 registers the effect that the setting selected in the selection designation area 25F on the display setting screen is set as the display setting, in the storage 23.

In step 636, the CPU 21 reads the storage 23, and generates the second menu screen from the information registered through the above described process.

In step 638, the CPU 21 performs a control so as to display, on the display 25, the second menu screen generated through the process in step 636, and ends the second menu screen display processing. When the second menu screen display processing is ended, the CPU 21 proceeds to step 214 in the terminal processing (see FIG. 9).

Figure 20:
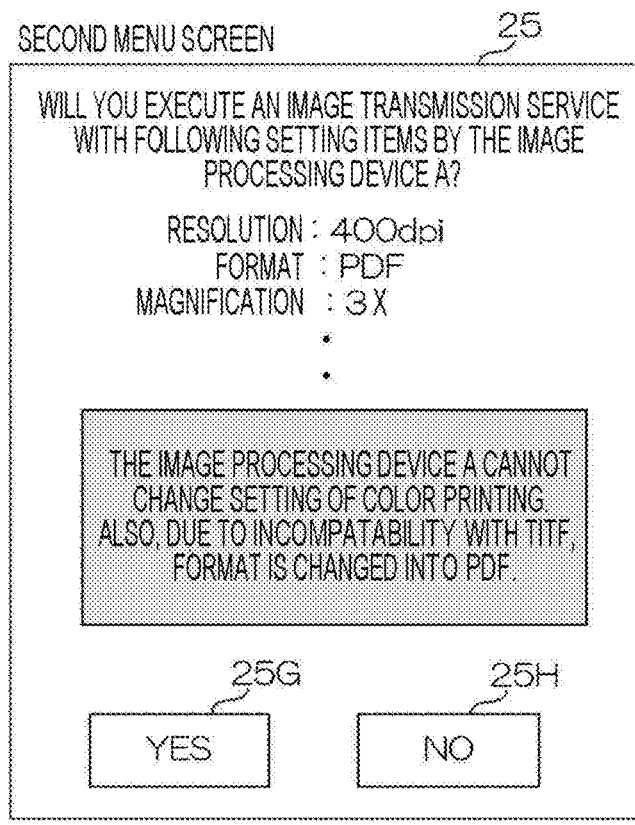
FIG. 20 is a front view illustrating an example of a second menu screen of the exemplary embodiment.

As illustrated in FIG. 20, on the second menu screen of the present exemplary embodiment, the execution items and the display settings corresponding to the execution service (the image transmission service in the example illustrated in FIG. 20) are displayed. When there is no display setting corresponding to the execution item (color printing in the example illustrated in FIG. 20), such effect is displayed on the second menu screen of the present exemplary embodiment. That is, when the CPU 21 executes the process in step 626, such effect is displayed on the second menu screen of the present exemplary embodiment. When the provided setting (tagged image file format (TITF) in the example illustrated in FIG. 20) is set as the display setting, the reason why the process has been executed is displayed on the second menu screen of the present exemplary embodiment. That is, when the CPU 21 has executed the process in step 624, the reason why the process has been executed is displayed on the second menu screen of the present exemplary embodiment.

As an example, when the second menu screen illustrated in FIG. 20 is displayed on the display 25, if applying the execution items and the display settings displayed on the second menu screen to execute the execution service, the user selects the YES button 25G via the input unit 24. Meanwhile, when not applying the execution items and the display settings so as not to execute the execution service, the user selects a NO button 25H via the input unit 24.

While the exemplary embodiment has been described, the technical scope of the present disclosure is not limited to the scope described in the exemplary embodiment. Various changes or modifications may be made in the exemplary embodiment without departing from the gist of the present disclosure, and the changed or modified exemplary embodiment still falls within the scope of the present disclosure.

The above-described exemplary embodiment does not limit claims. All combinations of the features described in the exemplary embodiment are not necessarily essential for implementing the objective sought to be achieved by the present disclosure. The above-described exemplary embodiment includes inventions at various stages, and various inventions are extracted by combining plural disclosed elements. Even if some constituent requirements are deleted from all constituent requirements illustrated in the exemplary embodiment, a configuration in which some constituent requirements are deleted may be extracted as an invention as long as the effect is obtained.

For example, in the present exemplary embodiment, the terminal processing system 100 includes a single terminal device 20 accessible to the network 50, and the terminal device 20 has plural roles. Alternatively, the terminal processing system 100 may include plural terminal devices 20 accessible to the network 50, and the terminal device 20 may have a single role. In this case, the user's trouble in selecting any of roles on the role selection screen may be omitted. Further alternatively, the terminal processing system 100 may include plural terminal devices 20 accessible to the network 50, and the terminal device 20 may have plural roles.

In the present exemplary embodiment, as the acceptance of selection of the information processing device 10, the effect that communication between the operation unit 17 and the short-range communication unit 27 has succeeded is accepted from the target information processing device. Alternatively, in the above acceptance, selection from plural information processing devices displayed on the display 25 may be accepted via the input unit 24 after the terminal device 20 activates an application for causing the information processing device 10 to execute a service.

In the present exemplary embodiment, when the display information is information indicating that a target service is displayed and the number of executions of the target service is equal to or greater than the first threshold number of times, the CPU 21 sets P1 as the display area of the target service. Alternatively, when the above conditions are satisfied, the CPU 21 may allow the user to select whether to set P1 as the display area of the target service. Even when the display information is unspecified information, and the number of executions of the target service is equal to or greater than the second threshold number of times, the CPU 21 may allow the user to select whether to set P1 as the display area of the target service.

In the present exemplary embodiment, when the display information is unspecified information, and the number of executions of the target service corresponding to the display information is less than the second threshold number of times, the CPU 21 sets P2 as the display area of the target service. Alternatively, when the above conditions are satisfied, the CPU 21 may allow the user to select whether to set P2 as the display area of the target service. When the display information is information indicating that the target service is displayed, and the number of executions of the target service corresponding to the display information is less than the first threshold number of times, the CPU 21 may allow the user to select whether to set P2 as the display area of the target service.

The CPU 21 may changes the display information corresponding to a service in which the number of executions is equal to or greater than the first threshold number of times, into information indicating that the service is displayed regardless of the information determined by the user in advance, or the CPU 21 may allow the user to select whether to apply the change.

The CPU 21 may change the display information corresponding to a service in which the number of executions is less than the second threshold number of times, into information indicating that the service is not displayed or into unspecified information regardless of the information determined by the user in advance, or the CPU 21 may allow the user to select whether to apply the change.

In the present exemplary embodiment, a menu screen displaying setting items applied when an execution service is executed by the target information processing device is employed as the second menu screen. Alternatively, a menu screen displaying setting items applied when a service is executed by any of the information processing devices 10 may be employed as the second menu screen.

In the present exemplary embodiment, when the change setting is not included in the providable settings, the CPU 21 sets the provided setting as the execution setting. Alternatively, when the above conditions are satisfied, the CPU 21 may allow the user to select a desired setting among the providable settings, as the change setting, or the user may be urged to re-input the change setting until the change setting is included in the providable settings.

In the present exemplary embodiment, when no execution setting is specified, or when the execution setting is not included in the providable settings, the CPU 21 sets the provided setting as the display setting. Alternatively, when the above conditions are satisfied, the CPU 21 may allow the user to select a desired setting among the providable settings, as the display setting.

In the present exemplary embodiment, before the second menu screen is displayed, the CPU 21 acquires the prohibition setting information from the target information processing device, and determines whether the display settings include a prohibition setting. Alternatively, it may be determined whether the display settings include a prohibition setting when the target information processing device accepts an instruction to execute an execution service by the second menu screen from the terminal device 20. Also, the prohibition setting information may be stored in advance in the storage 23 included in the terminal device 20.

In the above exemplary embodiment, the processor refers to a processor in a broad sense, and includes a general-purpose processor (for example, CPU or the like), and a dedicated processor (for example, a graphics processing unit (GPU), an application specific integrated circuit (ASIC), a field programmable gate array (FPGA), a programmable logic device, or the like).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the above exemplary embodiment, descriptions have been made on a case where the terminal processing program 23A is installed in advance in the storage 23. It is noted that the present disclosure is not limited thereto. For example, the terminal processing program 23A may be provided while stored in a storage medium such as a compact disc read only memory (CD-ROM), or may be provided via a network.

In the above exemplary embodiment, descriptions have been made on a case where the terminal processing is implemented through a software configuration by using a computer when a program is executed. It is noted that the present disclosure is not limited thereto. For example, the terminal processing may be implemented by a hardware configuration, or a combination of a hardware configuration and a software configuration.

In addition, the configuration (see FIG. 1) of the terminal processing system 100 described in the above exemplary embodiment is an example, and it is needless to say that unnecessary parts may be deleted or new parts may be added within a range that does not deviate from the gist of the present disclosure.

The flow (see FIG. 9) of the terminal processing described in the above exemplary embodiment is also an example, and it is needless to say that unnecessary steps may be deleted, new steps may be added, or the processing order may be changed within a range that does not deviate from the gist of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A mobile terminal device comprising a processor configured to:
   accept selection of an information processing device as a target to which an instruction to execute a service is to be sent;
   acquire provision information from the information processing device, the provision information being information on the service provided by the information processing device; and
   perform a control so as to display a first menu screen on a display of the mobile terminal device, wherein
   display information is information that is set in the mobile terminal device and that indicates whether to display each of a plurality of the services,
   the first menu screen is a menu screen that is based on (i) the provision information and (ii) the display information and that allows a user to select the service to be executed by the information processing device,
   the display information is based on a history of a number of times that each service has been executed for the user, and
   the processor is configured to, when the service that the information processing device can provide is displayed on the first menu screen and no display setting has been made for the display information regarding the service, perform a control so as to set the display information to information indicating that the service is not to be displayed.

2. The mobile terminal device according to claim 1, wherein
   the processor is configured to, when the display information corresponding to the service that the information processing device cannot provide is information indicating that the service is to be displayed on the first menu screen, perform a control so as to display the service on the first menu screen in a grayed-out state.

3. The mobile terminal device according to claim 1, wherein
   the processor is configured to, when the number of times the service has been executed by the information processing device is equal to or greater than a first threshold number of times, perform a control so as to change the display information corresponding to the service.

4. The mobile terminal device according to claim 2, wherein
   the processor is configured to, when the number of times the service has been executed by the information processing device is equal to or greater than a first threshold number of times, perform a control so as to change the display information corresponding to the service.

5. The mobile terminal device according to claim 1, wherein
   the processor is configured to, when the number of times the service has been executed by the information processing device is less than a second threshold number of times, perform a control to change the display information corresponding to the service.

6. The mobile terminal device according to claim 2, wherein
   the processor is configured to, when the number of times the service has been executed by the information processing device is less than a second threshold number of times, perform a control to change the display information corresponding to the service.

7. The mobile terminal device according to claim 1, wherein
   the processor is configured to, when performing (i) a control so as not to display the service on the first menu screen or (ii) a control so as to display the service in a grayed-out state on the first menu screen, perform a control so as to further present a reason why the control is performed.

8. The mobile terminal device according to claim 1, wherein the display information is information preset for each of a plurality of roles.

9. The mobile terminal device according to claim 1, wherein the processor is configured to generate the first menu screen based on the provision information and the display information.

10. The mobile terminal device according to claim 1, wherein
    the processor is configured to perform a control so as to display a second menu screen on the display, and
    the second menu screen is a menu screen that is based on (i) the provision information and (ii) setting information that indicates a setting item to be applied when the service is executed by the information processing device.

11. The mobile terminal device according to claim 10, wherein
    the processor is configured to, when (i) the setting information is not included in the provision information or (ii) the setting information is not set, perform a control so as to display provided setting information on the second menu screen, and
    the provided setting information is information that indicates a predetermined setting item to be applied when the service is provided by the information processing device.

12. The mobile terminal device according to claim 11, wherein
    the processor is configured to
      further accept an instruction indicating whether to apply the setting item corresponding to (i) the setting information or (ii) the provided setting information displayed on the second menu screen, to cause the information processing device to execute the service, and
      when the instruction is an instruction indicating that the setting item is applied to provide the service, further perform a control such that the setting item is applied and the service is executed by the information processing device.

13. The mobile terminal device according to claim 10, wherein the processor is configured to
further accept a change of the setting information, and when the accepted setting information is not included in the provision information, to perform a control so as to change the setting information to provided setting information that is information indicating a predetermined setting item to be applied when the service is provided by the information processing device.

14. The mobile terminal device according to claim 1, wherein the mobile terminal device is a tablet terminal or a laptop personal computer.

15. A non-transitory computer readable medium storing a program causing a mobile computer to execute terminal processing, the terminal processing comprising:
accepting selection of an information processing device as a target to which an instruction to execute a service is to be sent;
acquiring provision information from the information processing device, the provision information being information on the service provided by the information processing device; and
performing a control so as to display a first menu screen on a display of the mobile computer, wherein
display information is information that is set in an own device and that indicates whether to display each of a plurality of the services,
the first menu screen is a menu screen that is based on (i) the provision information and (ii) the display information and that allows a user to select the service to be executed by the information processing device, wherein
the display information is based on a history of a number of times that each service has been executed for the user, and
when the service that the information processing device can provide is displayed on the first menu screen and no display setting has been made for the display information regarding the service, the terminal processing further comprises performing a control so as to set the display information to information indicating that the service is not to be displayed.

16. The non-transitory computer readable medium according to claim 15, wherein the mobile computer is a tablet terminal or a laptop personal computer.

\* \* \* \* \*